(12) United States Patent
Huang et al.

(10) Patent No.: US 9,984,709 B1
(45) Date of Patent: May 29, 2018

(54) HEAT ASSISTED MAGNETIC RECORDING (HAMR) MEDIA WITH THERMAL EXCHANGE CONTROL LAYER OF LOWER CURIE TEMPERATURE

(71) Applicant: Seagate Technology LLC, Cupertino, CA (US)

(72) Inventors: Pin-Wei Huang, Fremont, CA (US); YinFeng Ding, Fremont, CA (US); YingGuo Peng, San Ramon, CA (US); Xiaobin Zhu, San Ramon, CA (US); Kai-Chieh Chang, Pleasanton, CA (US); Yukiko Kubota, Campbell, CA (US); Timothy J. Klemmer, Union City, CA (US); QiHong Wu, Dublin, CA (US); Ganping Ju, Pleasanton, CA (US); Jan-Ulrich Thiele, Sunnyvale, CA (US); Florin Zavaliche, San Ramon, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/466,798

(22) Filed: Mar. 22, 2017

(51) Int. Cl.
| | |
|---|---|
| *G11B 11/00* | (2006.01) |
| *G11B 5/66* | (2006.01) |
| *G11B 5/65* | (2006.01) |
| *G11B 5/00* | (2006.01) |
| *G11B 7/126* | (2012.01) |
| *G11B 5/60* | (2006.01) |

(52) U.S. Cl.
CPC ............ *G11B 5/66* (2013.01); *G11B 5/653* (2013.01); *G11B 5/656* (2013.01); *G11B 5/6088* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,521,137 B2 | 4/2009 | Hohlfeld et al. | |
| 8,460,805 B1 | 6/2013 | Gao et al. | |
| 8,685,547 B2 | 4/2014 | Bian et al. | |
| 8,988,976 B2 | 3/2015 | Chen et al. | |
| 9,177,585 B1 | 11/2015 | Seki et al. | |
| 9,224,411 B1 | 12/2015 | Gao et al. | |
| 9,349,402 B2 | 5/2016 | Chen et al. | |
| 9,520,151 B2 | 12/2016 | Qui et al. | |
| 9,558,777 B2 | 1/2017 | Hellwig et al. | |
| 9,697,859 B1 | 7/2017 | Tripathy et al. | |
| 2001/0051287 A1 | 12/2001 | Kikitsu et al. | |
| 2007/0048552 A1* | 3/2007 | Soeya | G11B 5/66 428/828 |
| 2009/0081484 A1* | 3/2009 | Watanabe | G11B 5/66 428/828 |
| 2009/0226762 A1* | 9/2009 | Hellwig | G11B 5/66 428/815 |

(Continued)

*Primary Examiner* — Tan X Dinh

(57) ABSTRACT

An apparatus is disclosed. The apparatus includes a storage layer, a thermal exchange control layer disposed over the storage layer, and a write layer disposed over the thermal exchange control layer. A Curie temperature of the thermal exchange control layer is lower than a Curie temperature of the storage layer. The Curie temperature of the thermal exchange control layer is lower than a Curie temperature of the write layer.

14 Claims, 12 Drawing Sheets

(56) References Cited

U.S. PATENT DOCUMENTS

| | | | |
|---|---|---|---|
| 2010/0182714 A1* | 7/2010 | Kanbe | G11B 5/65 369/13.33 |
| 2011/0235205 A9* | 9/2011 | Lu | G11B 5/314 369/13.33 |
| 2013/0235491 A1* | 9/2013 | Mosendz | B82Y 30/00 428/827 |
| 2016/0148632 A1* | 5/2016 | Hellwig | G11B 5/66 360/75 |
| 2016/0225394 A1* | 8/2016 | Moriya | G11B 5/65 369/13.33 |

* cited by examiner

HEAT ASSISTED MAGNETIC RECORDING (HAMR) MEDIA WITH THERMAL EXCHANGE CONTROL LAYER OF LOWER CURIE TEMPERATURE

BACKGROUND

Certain devices use disk drives with heat assisted magnetic recording (HAMR) media to store information. For example, disk drives can be found in many desktop computers, laptop computers, and data centers. HAMR media store information magnetically as bits. In HAMR writing process, presence of noise sources, e.g., freezing (DC) noise from inadequate Zeeman splitting in the presence of filed, transition noise dominated by temperature spatial gradient usually defined by the near-field transducer (NFT) the Curie temperature and variations in anisotropy field from grain to grain, roughness of the media surface, etc., may prevent HAMR media to reach its ultimate areal density capability.

SUMMARY

Provided herein is an apparatus that is capable of suppressing noise, e.g., freezing (DC) noise, transition noise, etc., and further is capable of reducing the write temperature. The apparatus includes a storage layer, a thermal exchange control layer disposed over the storage layer, and a write layer disposed over the thermal exchange control layer. A Curie temperature of the thermal exchange control layer is lower than a Curie temperature of the storage layer. The Curie temperature of the thermal exchange control layer is lower than a Curie temperature of the write layer. These and other features and advantages will be apparent from a reading of the following detailed description.

DESCRIPTION

Figure 1A:
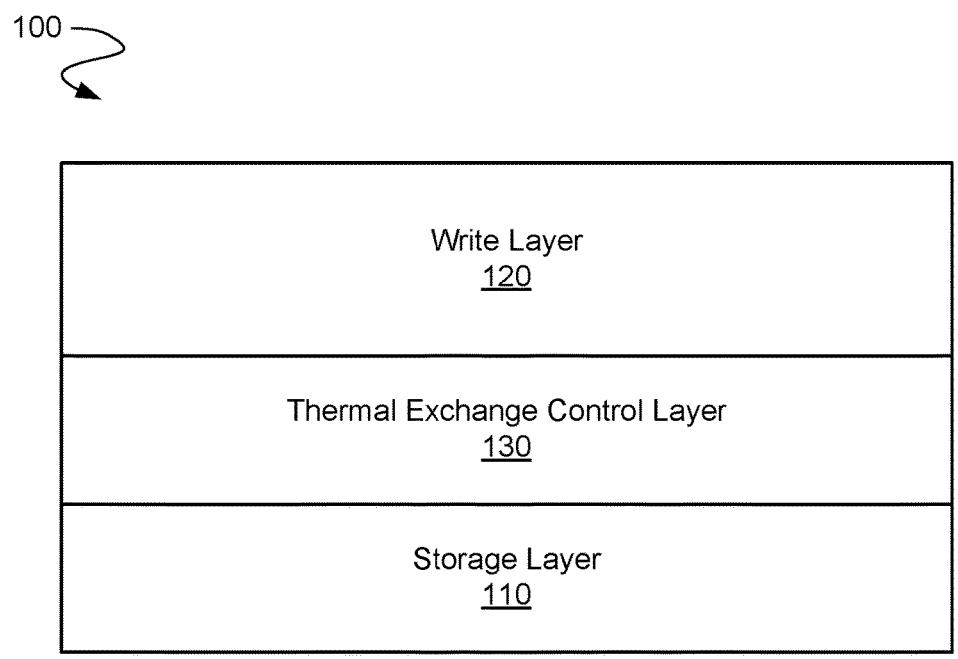
FIGS. 1A-1B show a heat assisted magnetic recording (HAMR) media and performance thereof according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

As the technology of heat assisted magnetic recording (HAMR) media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. However, increasing the bit density can decrease the signal to noise ratio ("SNR") below acceptable levels, for example by introducing freezing (DC) noise from inadequate Zeeman splitting in the presence of filed, transition noise dominated by temperature spatial gradient usually defined by the near-field transducer (NFT) the variations in Curie temperature and anisotropy field from grain to grain, roughness of the media surface, etc. Presence of noise can be mitigated by introducing a thermal exchange control layer in between the storage layer and the write layer of the HAMR media. In some embodiments, the write temperature may be reduced as a result of introducing the thermal exchange control layer.

According to some embodiments, the thermal exchange control layer may include magnetic material. Furthermore, it is appreciated that the thermal exchange control layer may partially or completely couple and decouple the write layer and the storage layer during the heating process of writing information that is followed by the cooling process. Coupling and decoupling between the storage layer and the write layer, using the thermal exchange control layer, during the heating and cooling process to write information in the storage layer, decouples the noise of the write layer from that of the storage layer, thereby reducing the overall noise once the HAMR media is returned to a temperature below the Curie temperature. It is appreciated that the Curie temperature of the thermal exchange control layer is lower than the Curie temperature of the storage layer which has a lower Curie temperature than the Curie temperature of the write layer.

It is understood HAMR media may include both granular magnetic layers and continuous magnetic layers. Granular layers include grains that are segregated in order to physically and magnetically decouple the grains from one another. Segregation of the grains may be done, for example, with formation of oxides at the boundaries between adjacent magnetic grains. As such, the segregated magnetic grains form a granular layer. When multiple granular layers stacked together they form a columnar structure, where the magnetic alloys are hetero-epitaxially grown into columns while the oxides segregate into grain (column) boundaries. HAMR media may include both granular layers and continuous layers. In various embodiments, continuous layers include zero or much less segregation materials than found in the granular layers.

Referring now to FIG. 1A, a heat assisted magnetic recording (HAMR) media 100 according to one aspect of the present embodiments is shown. The HAMR media 100 includes a storage layer 110, a thermal exchange control layer 130 deposited over the storage layer 110, and a write layer 120 deposited over the thermal exchange control layer 130. It is appreciated that in some embodiments, the thermal exchange control layer 130 is deposited and it is in direct contact with the storage layer 110. It is further appreciated that in some embodiments, the write layer 120 is deposited and it is in direct contact with the thermal exchange control layer 130. The thermal exchange control layer 130 has a lower Curie temperature than the storage layer 110 or the write layer 120. In some embodiments, the Curie temperature of the storage layer 110 is lower than the Curie temperature of the write layer 120.

The thermal exchange control layer 130 is introduced between the write layer 120 and the storage layer 110 in order to mitigate noise, thereby improving performance and reliability while increasing areal density. The thermal exchange control layer 130 may include magnetic material and it may use temperature to tune the vertical exchange coupling between the write layer 120 and the storage layer 110 to suppress noise. It is appreciated that the write temperature may be reduced as a result of introducing the thermal exchange control layer 130.

As previously stated, the thermal exchange control layer 130 has a lower Curie temperature than the write layer 120 and the storage layer 110. For example, the Curie temperature of the thermal exchange control layer 130 may be at least 25-100 K less than the Curie temperature of the storage layer 110. Thus, during the HAMR write process, e.g., during heating and subsequently cooling period through high temperature with near field transducer (NFT), the vertical coupling between the write layer 120 and the storage layer 110 can be at least partially or completely turned on/off due to magnetization dependence of the thermal exchange control layer 130.

According to some embodiments, the write layer 120 may include material such as FePt or its alloy thereof. In other embodiments, the write layer 120 may include material such as CoPt or alloy thereof, FeCoPt or alloy thereof, CoCrPt or alloy thereof, Co or alloy thereof, FeCo or alloy thereof, etc. It is appreciated that the write layer 120 has a higher Curie temperature in comparison to the storage layer 110. Moreover, in some embodiments, the write layer 120 has a higher room temperature saturation magnetization than the storage layer 110. Furthermore, the anisotropy field for the write layer 120 is lower than the anisotropy field for the storage layer 110, in some embodiments. The thickness of the write layer 120 may range between 0.2-3 nm. In some embodiments, the thickness may range between 0.5-5 nm.

It is appreciated that the write layer 120 may be a continuous layer or one or more granular layers. For example, the write layer 120 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof.

According to some embodiments, the storage layer 110 may include material such as FePt or its alloy thereof. It is appreciated that the storage layer 110 has a higher Curie temperature in comparison to the thermal exchange control layer 130 but lower Curie temperature than the write layer 120. In some embodiments, the storage layer 110 has an anisotropy field that is higher than or equal to the anisotropy field for the write layer 120. The thickness of the storage layer 110 may range between 2-15 nm.

It is appreciated that the storage layer 110 may be a continuous layer or one or more granular layers. For example, the storage layer 110 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof.

In some embodiments, the thermal exchange control layer 130 may include material such as FePt or an alloy thereof. For example, the thermal exchange control layer 130 may include FePtCu, FePtRu, FePtNi, FePtRh, FePtNd, FePtAg, FePtMn, etc. It is appreciated that the alloy of FePt may be selected for the thermal exchange control layer 130 such that the Curie temperature of the thermal exchange control layer 130 is lowered to a level that it is lower than the Curie temperature of the storage layer 110. In some embodiments, the anisotropy field of the thermal exchange control layer 130 falls near the anisotropy field of the storage layer 110. In embodiments the transition region for recording is sharper where the anisotropy field of the thermal exchange control layer 130 is higher than the anisotropy field of the storage layer 110. It is appreciated that the anisotropy field of the thermal exchange control layer 130 is maintained as close to the anisotropy field of the storage layer 110 as possible if the anisotropy field of the storage layer 110 is the highest anisotropy field within the HAMR media 100.

It is appreciated that the thermal exchange control layer 130 may be a continuous layer or one or more granular layers. For example, the thermal exchange control layer 130 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof. According to some embodiments, the thermal exchange control layer 130 maintains the granular structures, magnetization orientation and anisotropy between the storage layer 110 to the write layer 120.

Accordingly, the thermal exchange control layer 130 by virtue of its lower Curie temperature in comparison to the write layer 120 and the storage layer 110, during the HAMR write process, decouples the noise present in the write layer 120 from the storage layer 110. As such, the amount of noise is reduced. In some embodiments, the write layer 120 stabilizes the storage layer 110 during the cooling period of the HAMR write process using the thermal exchange control layer 130 because the Curie temperature of the thermal exchange control layer 130 is lower than the Curie temperature of the storage layer 110 which has a lower Curie temperature than the write layer 120, thereby reducing freezing noise.

It is appreciated that the Curie temperature of the thermal exchange control layer 130 once deposited between the storage layer 110 and the write layer 120 may be higher than a Curie temperature of a standalone thermal exchange control layer 130, known as polarization effect. As such, the spin moments in the write layer 120 below its Curie temperature may polarize the spins in the thermal exchange control layer 130 at temperatures greater than the Curie temperature of the thermal exchange control layer 130, thereby maintaining the exchange coupling between write layer 120 and the storage layer 110 when the temperature is dropping from the Curie temperature of the write layer 120 to the Curie temperature of the thermal exchange control layer 130.

Figure 1B:
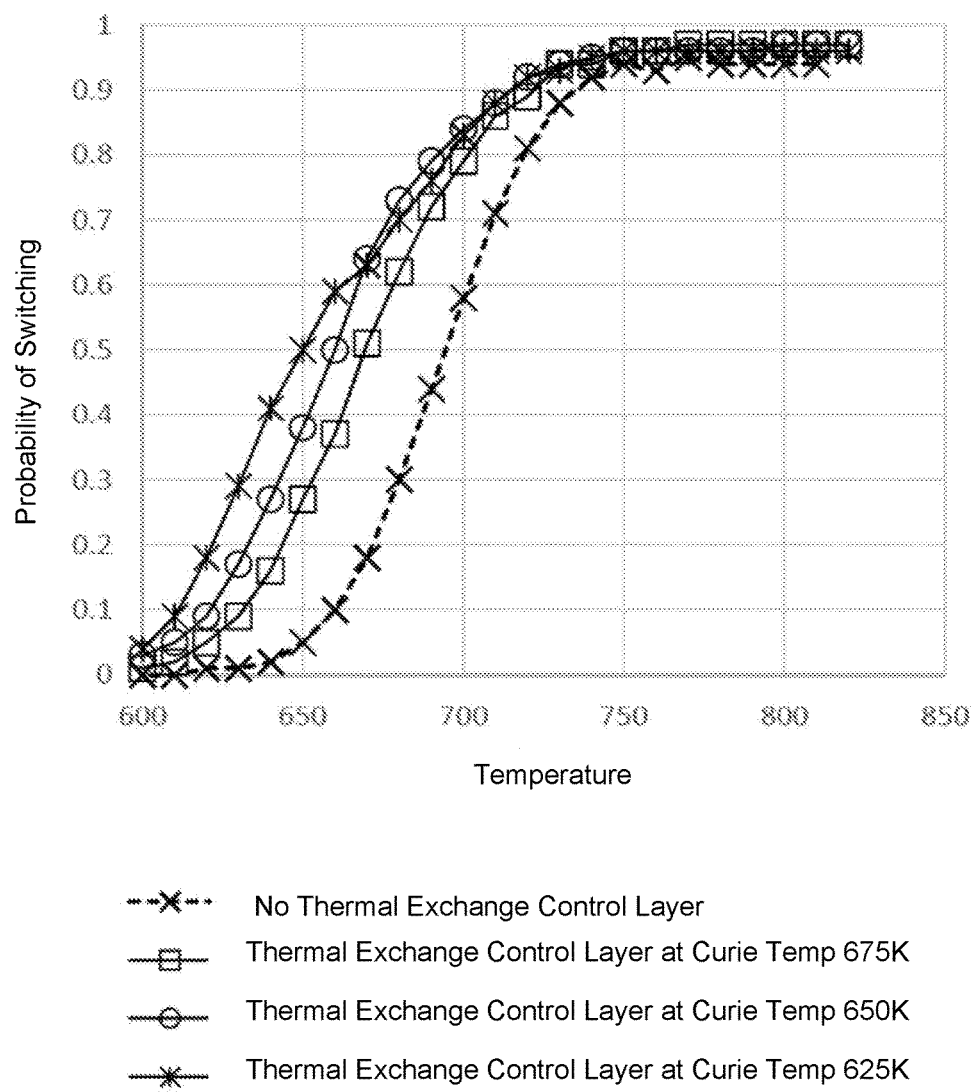

Referring now to FIG. 1B, performance of the HAMR media according to one aspect of the present embodiments is shown. As shown the probability of recorded bits switching is lowered at a lower temperature and higher at a higher temperature. Three exemplary simulations are shown for the thermal exchange control layer with three different Curie temperatures of 625K, 650K, and 675K. It is appreciated that a HAMR media with the thermal exchange control layer outperforms a HAMR media without the thermal exchange control layer in DC region (the plateau portion), as shown. It is therefore appreciated that the HAMR write temperature may be reduced without degradation in performance or that noise may be suppressed for the same HAMR write temperature.

Accordingly, it is appreciated that introduction of the thermal exchange control layer may lower the write temperature. Additionally, the use of the thermal exchange control layer in the HAMR media reduces transition jitters while maintaining DC signal to noise ratio (SNR) and a better off-track squeeze capability from the write layer.

FIGS. 2A-2H show the HAMR media that undergoes a write process according to one aspect of the present embodiments. The HAMR media 100 of FIGS. 2A-2H is similar to that of FIG. 1A described above.

Figure 2A:
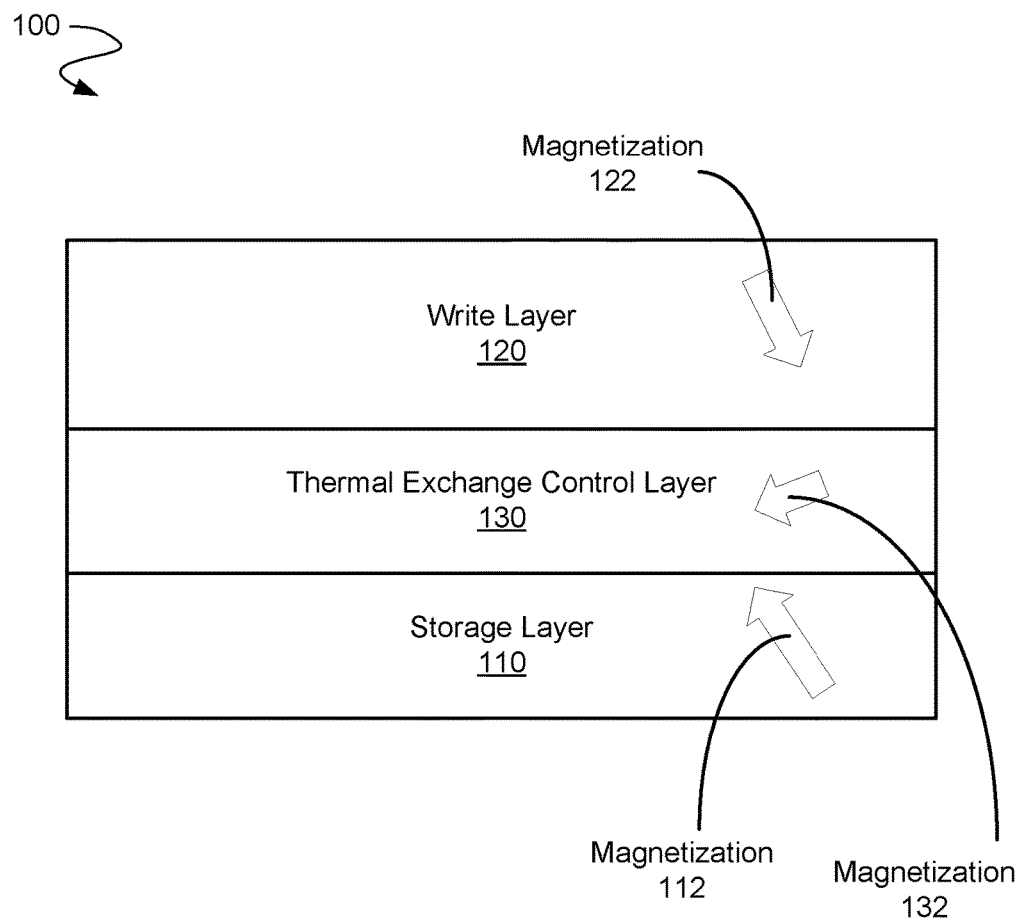
FIGS. 2A-2H show the HAMR media that undergoes a write process according to one aspect of the present embodiments.

Referring more specifically to FIG. 2A, a HAMR media 100 that includes the storage layer 110, the thermal exchange control layer 130, and the write layer 120, as discussed above is shown. FIG. 2A depicts a stage prior to the HAMR write process. As such, each layer may have a magnetization orientation of its own or it may be aligned due to exchange coupling between any two layers. For example, the write layer 120 may have a magnetization 122 orientation while the thermal exchange control layer 130 may have a magnetization 132 orientation while the storage layer 110 may have a magnetization 112 orientation, prior to the writing process.

It is appreciated that FIG. 2A may be directed to a period prior to the current HAMR write process but it may be directed to a previously write HAMR process. It is appreciated that if the HAMR media 100 has been written to in the past, then the magnetization orientations 122, 132 and 112 may be more aligned with one another, e.g., all substantially face down, all substantially face up, etc.

Figure 2B:
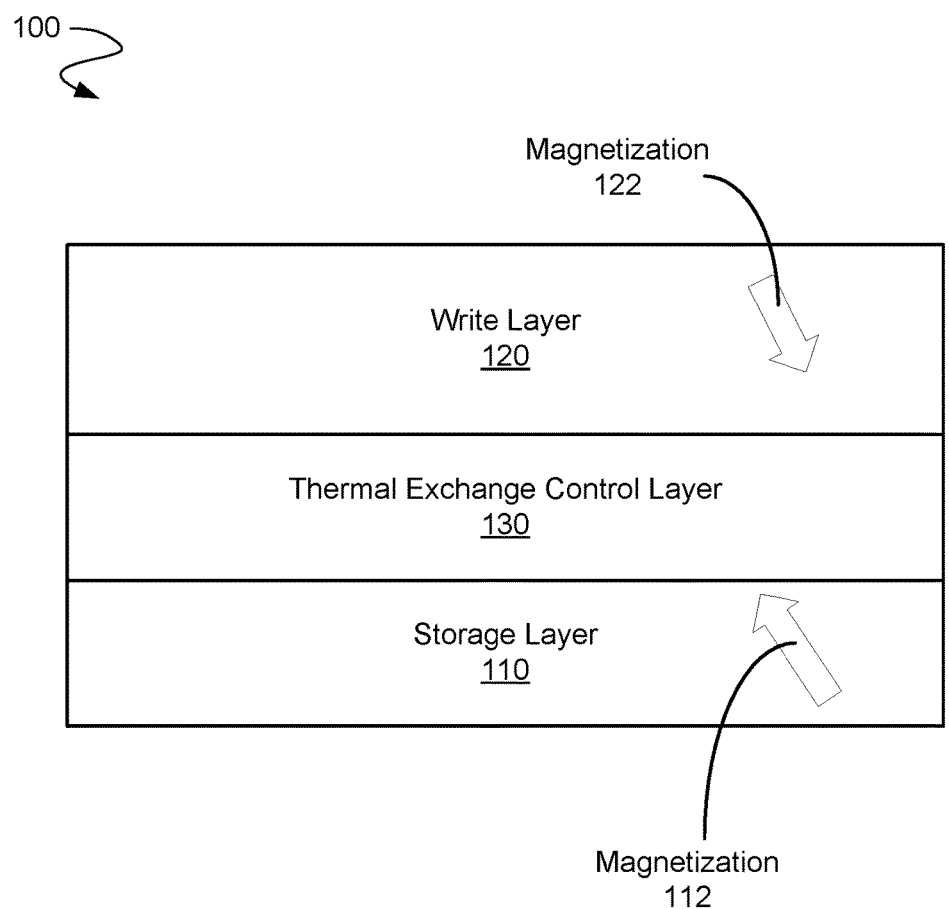

Referring now to FIG. 2B, the HAMR media 100 is heated to above the Curie temperature of the thermal exchange control layer 130 but it is still below the Curie temperatures of the write layer 120 and the storage layer 110. Accordingly, the magnetization orientation of the thermal exchange control layer 130 is substantially removed. In other words, the thermal exchange control layer 130 becomes partially non-magnetic at or above its Curie temperature. However, the magnetization orientation of the write layer 120 and the storage layer 110 are substantially maintained because their respective Curie temperatures have not been reached.

Figure 2C:
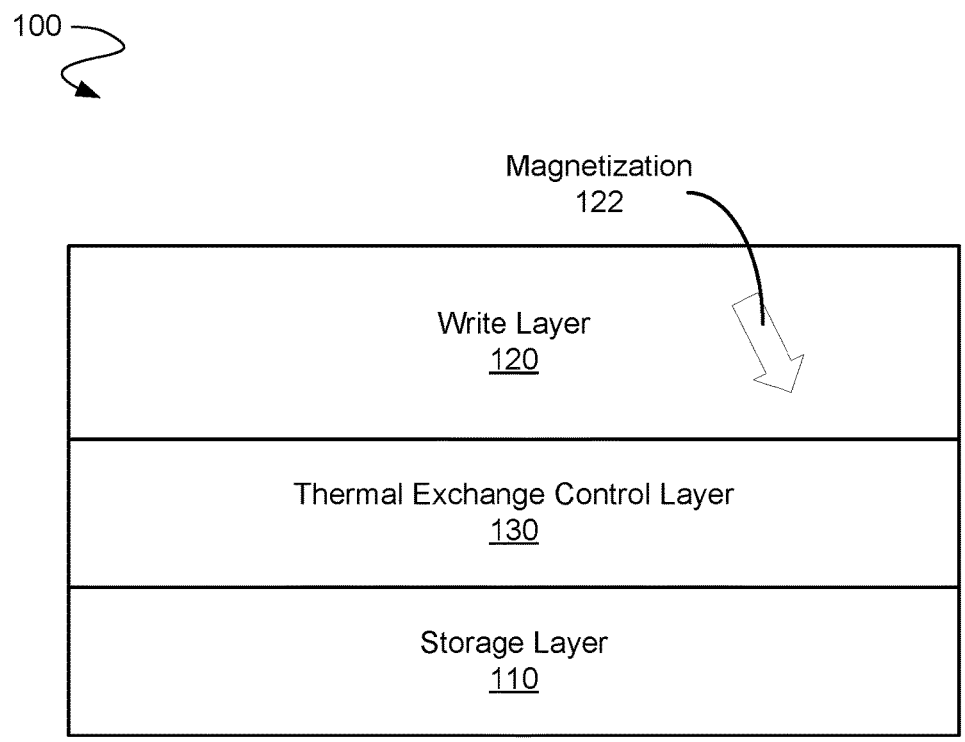

Referring now to FIG. 2C, the HAMR media 100 is heated substantially above the Curie temperature of the storage layer 110 but it is still below the Curie temperature of the write layer 120. Accordingly, the magnetization orientation of the storage layer 110 is substantially removed. In other words, the storage layer 110 becomes substantially non-magnetic at or above its Curie temperature. However, the magnetization orientation 122 of the write layer 120 is substantially maintained because its respective Curie temperature has not been reached.

Figure 2D:
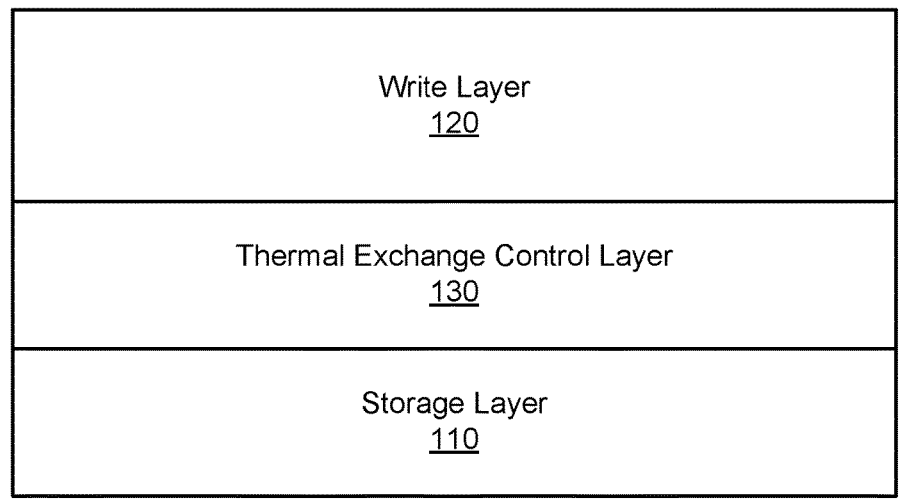

Referring now to FIG. 2D, the HAMR media 100 is heated to above the Curie temperature of the write layer 120. Accordingly, the magnetization orientation of the write layer 120 is substantially removed. In other words, the write layer 120 becomes substantially non-magnetic at or above its Curie temperature. Accordingly, heating the HAMR media 100 to a Curie temperature of the write layer 120 which is above the Curie temperature of the storage layer 110 which is above the Curie temperature of the thermal exchange control layer 130, substantially removes magnetization orientation of the HAMR media 100 and results in a substantially non-magnetic media. It is appreciated that in some embodiments, the HAMR media 100 is heated close to be still under the Curie temperature of the write layer 120. Thus, magnetization may still be present, however, the HAMR media 100 may be heated high enough to be able to record information within the write layer 120.

Figure 2E:
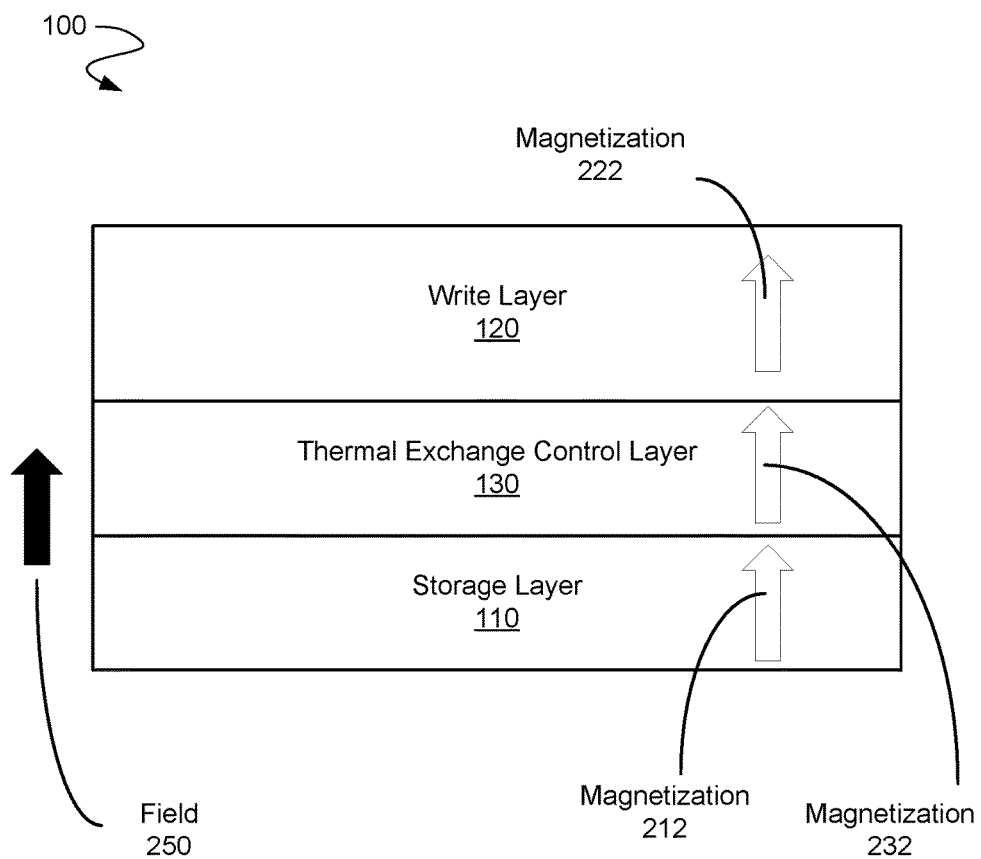

Referring now to FIG. 2E, a magnetic field 250 is applied to the HAMR media 100 while the HAMR media 100 is in its non-magnetic phase or superparamagnetic phase by heating the HAMR media 100 to or above the Curie temperature of the write layer 120. Application of the magnetic field 250 orients the magnetization orientation of the write layer 120 in the first place. Subsequent to application of the magnetic field 250, the thermal exchange control layer 130 will have a magnetization orientation 232 in presence of the oriented magnetization of the write layer 120 and the magnetic field 250. Moreover, the write layer 120 will have a magnetization orientation 222 in presence of the magnetic field 250 and while the HAMR media 100 is heated to or above the Curie temperature of the write layer 120.

Figure 2F:
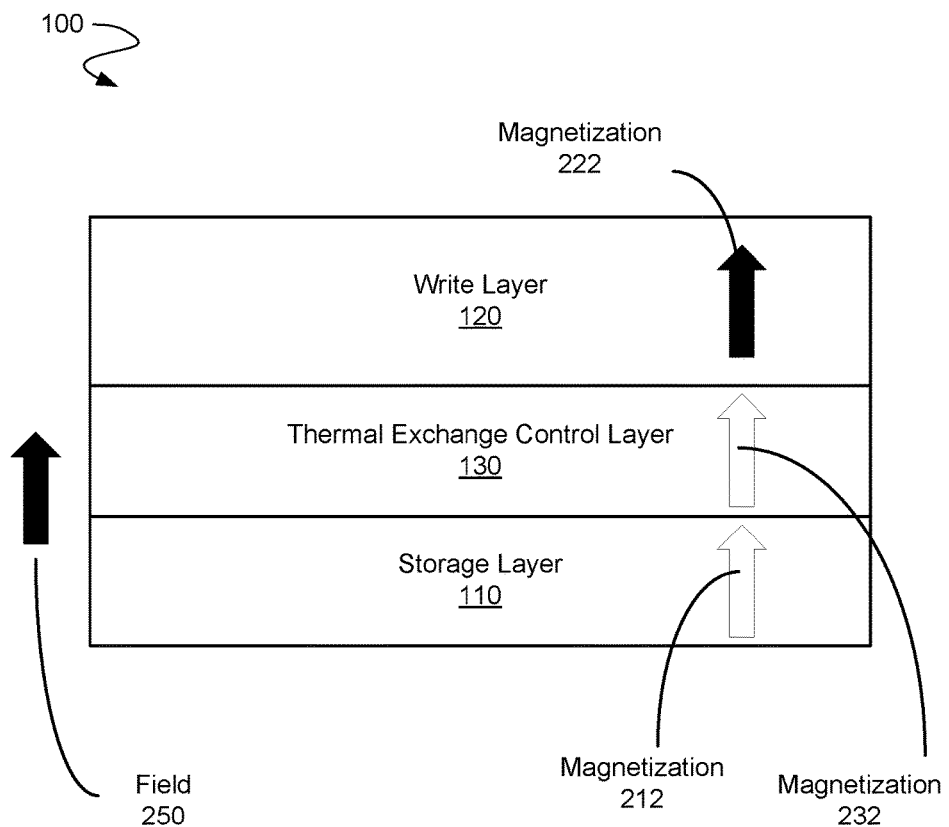

Referring now to FIG. 2F, the HAMR media 100 during the cooling period from the Curie temperature of the write layer 120 to a temperature below its Curie temperature but yet above the Curie temperatures of the thermal exchange control layer 130 and the storage layer 110 is shown. Thus, at a temperature that is below the Curie temperature of the write layer 120, the magnetization orientation 222 will be maintained by the write layer 120 even in absence of the field 250.

Figure 2G:
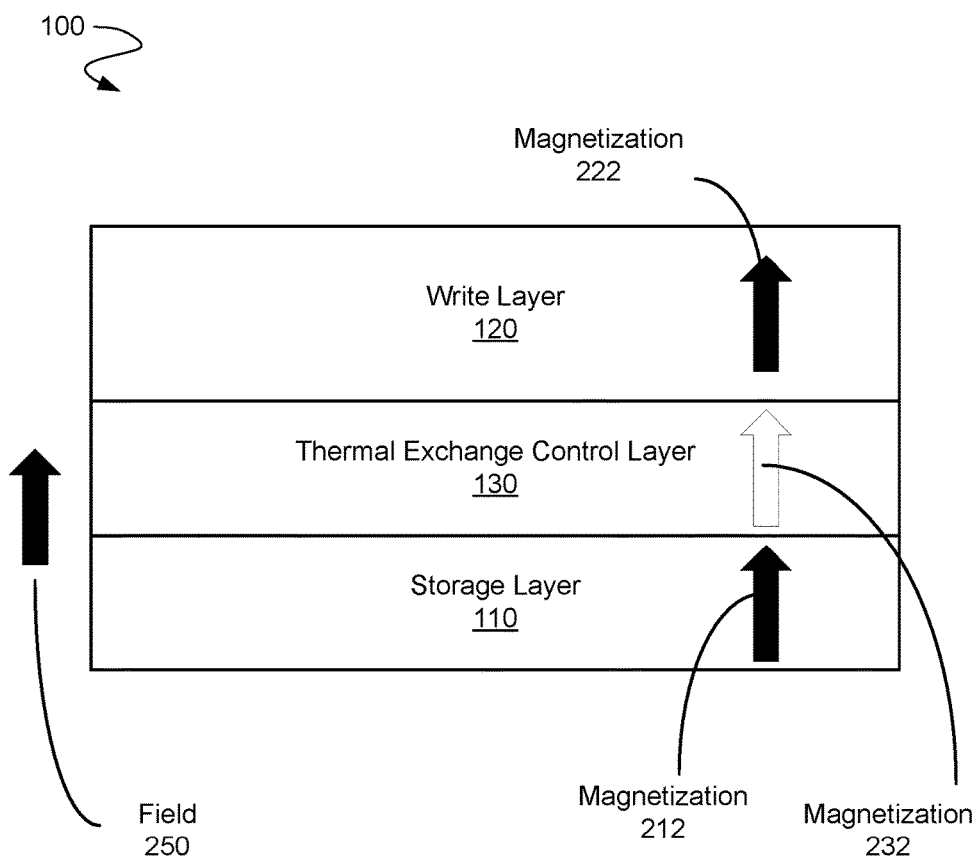

Referring now to FIG. 2G, the HAMR media 100 during the cooling period from a temperature at FIG. 2F to a temperature below the Curie temperature of the storage layer 110 but yet above the Curie temperature of the thermal exchange control layer 130 is shown. At a temperature that is below the Curie temperature of the storage layer 110, the magnetization orientation 212 will be maintained by the storage layer 110 even in absence of the field 250.

Figure 2H:
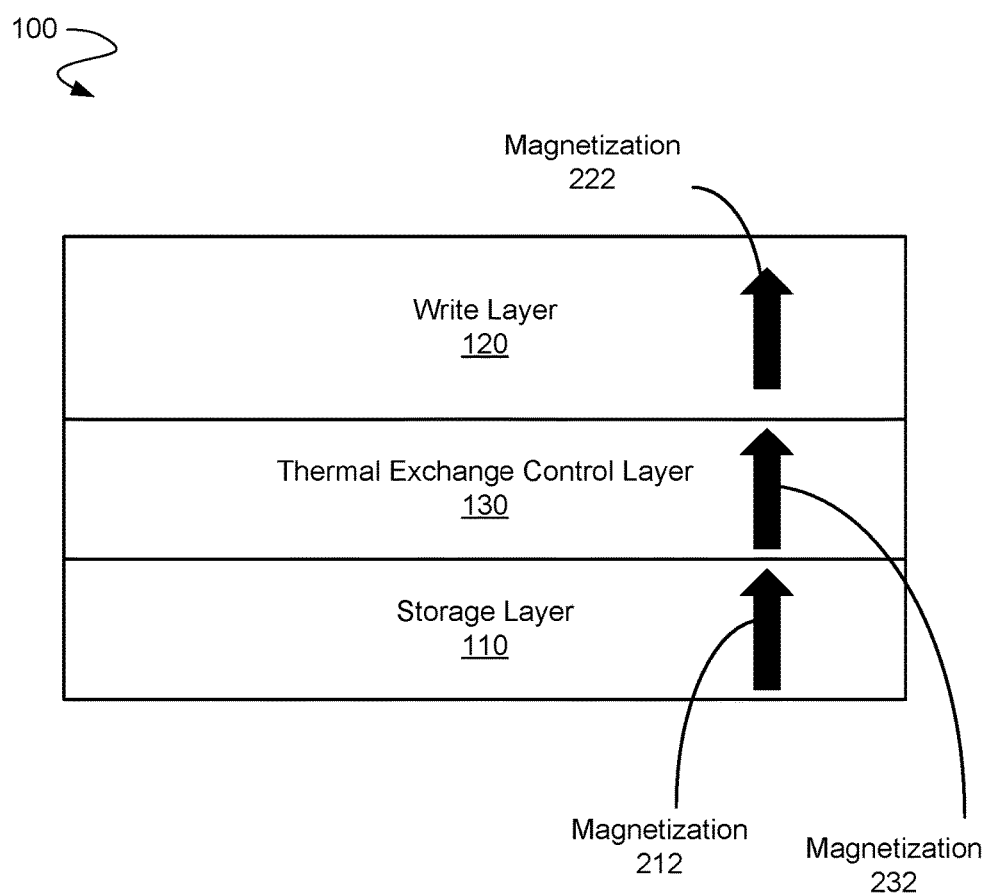

Referring now to FIG. 2H, the HAMR media 100 during the cooling period from a temperature at FIG. 2G to a temperature below the Curie temperature of the thermal exchange control layer 130 is shown. At a temperature that is below the Curie temperature of the thermal exchange control layer 130, the magnetization orientation 232 will be maintained by the thermal exchange control layer 130 even in absence of the field 250.

As such, the spin moments in the write layer 120 below its Curie temperature may polarize the spins in the thermal exchange control layer 130 at temperatures greater than the Curie temperature of the thermal exchange control layer 130, thereby maintaining the exchange coupling between write layer 120 and the storage layer 110 when the temperature is dropping from the Curie temperature of the write layer 120 to the Curie temperature of the thermal exchange control layer 130. Accordingly, the thermal exchange control layer 130 by virtue of its lower Curie temperature in comparison to the write layer 120 and the storage layer 110, during the HAMR write process, decouples the noise present in the write layer 120 from the storage layer 110. Thus, during the HAMR write process, e.g., during heating and subsequently cooling period through high temperature with near field transducer (NFT), the vertical coupling between the write layer 120 and the storage layer 110 can be at least partially or completely turned on/off due to magnetization dependence of the thermal exchange control layer 130. As such, the amount of noise is reduced. In some embodiments, the write layer 120 stabilizes the storage layer 110 during the cooling period of the HAMR write process using the thermal exchange control layer 130 because the Curie temperature of the thermal exchange control layer 130 is lower than the Curie temperature of the storage layer 110 which has a lower Curie temperature than the write layer 120, thereby reducing freezing noise.

It is appreciated that introduction of the thermal exchange control layer may lower the write temperature. Additionally, the use of the thermal exchange control layer in the HAMR media reduces transition jitters while maintaining DC signal to noise ratio (SNR) and a better off-track squeeze capability from the write layer.

Figure 3:
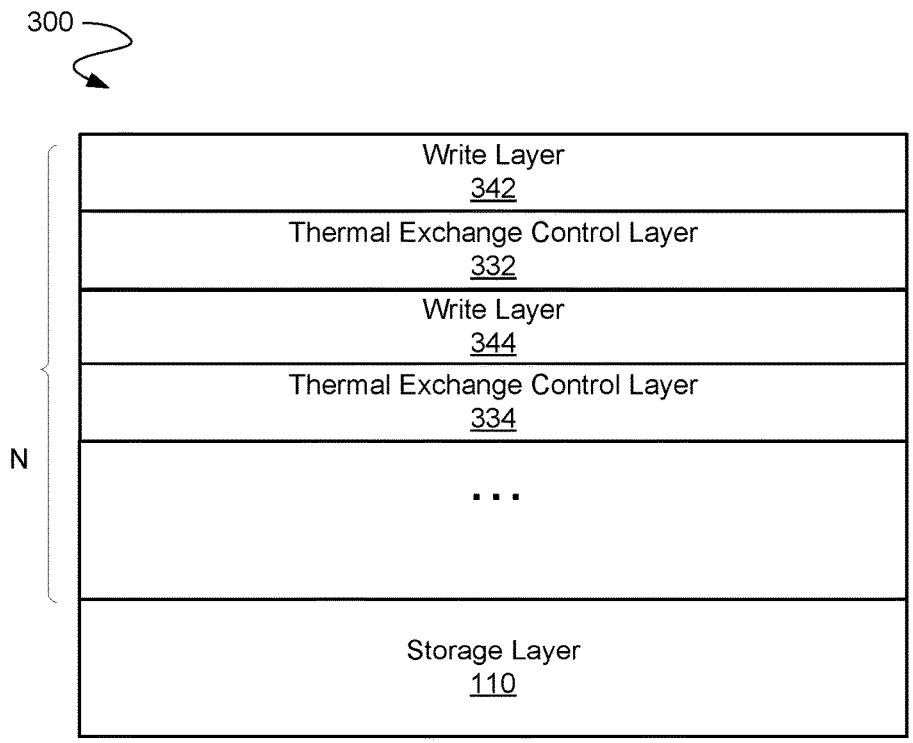
FIG. 3 shows another HAMR media according to one aspect of the present embodiments.

FIG. 3 shows another HAMR media 300 according to one aspect of the present embodiments. The HAMR media 300 is similar to that of HAMR media 100 in FIGS. 1A-2H, however, in this embodiment, multiple thermal exchange control layers and multiple write layers. For example, N number of thermal exchange control layers 332-334 are paired with N number of write layers 342-344. It is appreciated that use of multiple thermal exchange control layers 332-334 and that the use of multiple write layers 342-344 enable the use of various thermal exchange control layers and various write layers with different Curie temperatures. For example, the Curie temperature of the thermal exchange control layer 332 may be different from the Curie temperature of the thermal exchange control layer 334 while another thermal exchange control layer may have the same Curie temperature or a different Curie temperature than the thermal exchange control layers 332 and 334. It is appreciated that the Curie temperature of each thermal exchange control layers 332-334 may still be lower than each of the write layers 342-344 and the storage layer 110.

It is appreciated that the write layer 120 may similarly include multiple layers (not shown), and one or more thermal exchange control layers may separate one or more write layers. Moreover, it is appreciated that the storage layer 110 may similarly include multiple layers (not shown), and one or more thermal exchange control layers may separate one or more storage layers. Therefore, it is appreciated that various embodiments may include any combination of write layers, thermal exchange control layers, and storage layers stacked in various stacked combinations.

Figure 4:
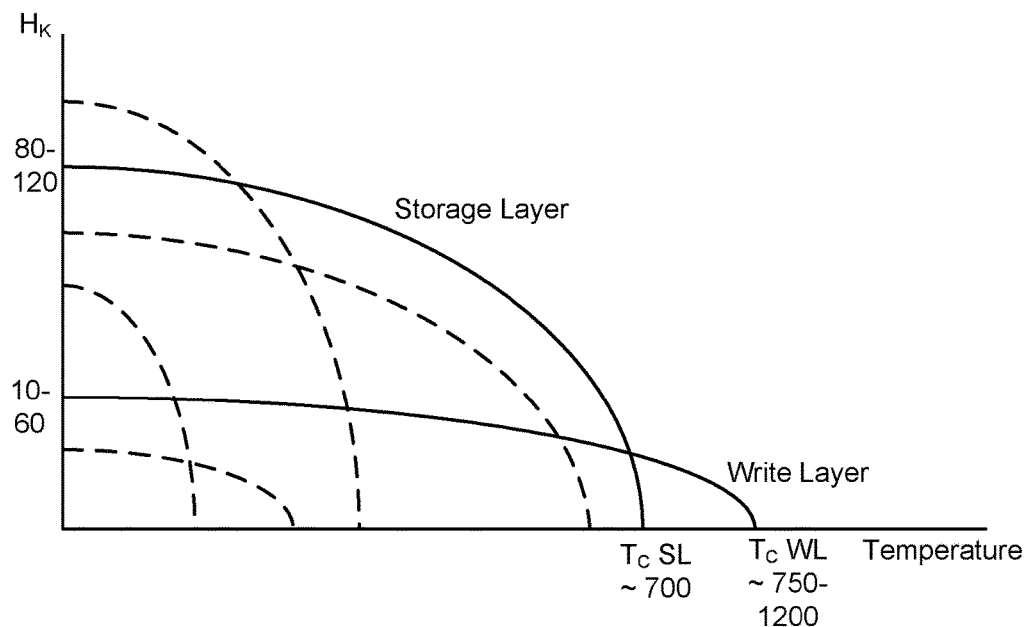
FIG. 4 shows an exemplary illustration of anisotropy versus the Curie temperature according to one aspect of the present embodiments.

FIG. 4 shows an exemplary illustration of anisotropy versus the Curie temperature according to one aspect of the present embodiments. Various thermal exchange control layers are shown as dashed lines. As seen, the Curie temperature of the write layer is higher than the Curie temperature of the storage layer which is higher than the Curie temperature of the thermal exchange control layer. In the illustrated embodiment, the Curie temperature of the write layer is approximately between 750-1200 K while the Curie temperature of the storage layer is approximately 700 K. The anisotropy field of the write layer at room temperature is approximately between 10-60 kOe, while the anisotropy field of the storage layer at room temperature is approximately between 60-120 kOe. It is appreciated that the anisotropy field of the thermal exchange control layer may be higher or lower than the anisotropy field of the storage layer and the write layer. However, the Curie temperature of the thermal exchange control layer is lower than the Curie temperatures of the storage layer and the write layer.

In some embodiments, the anisotropy field of the thermal exchange control layer falls near the anisotropy field of the storage layer. In embodiments the transition region for recording is sharper where the anisotropy field of the thermal exchange control layer is higher than the anisotropy field of the storage layer. It is appreciated that the anisotropy field of the thermal exchange control layer is maintained as close to the anisotropy field of the storage layer as possible if the anisotropy field of the storage layer is the highest anisotropy field within the HAMR media.

Figure 5:
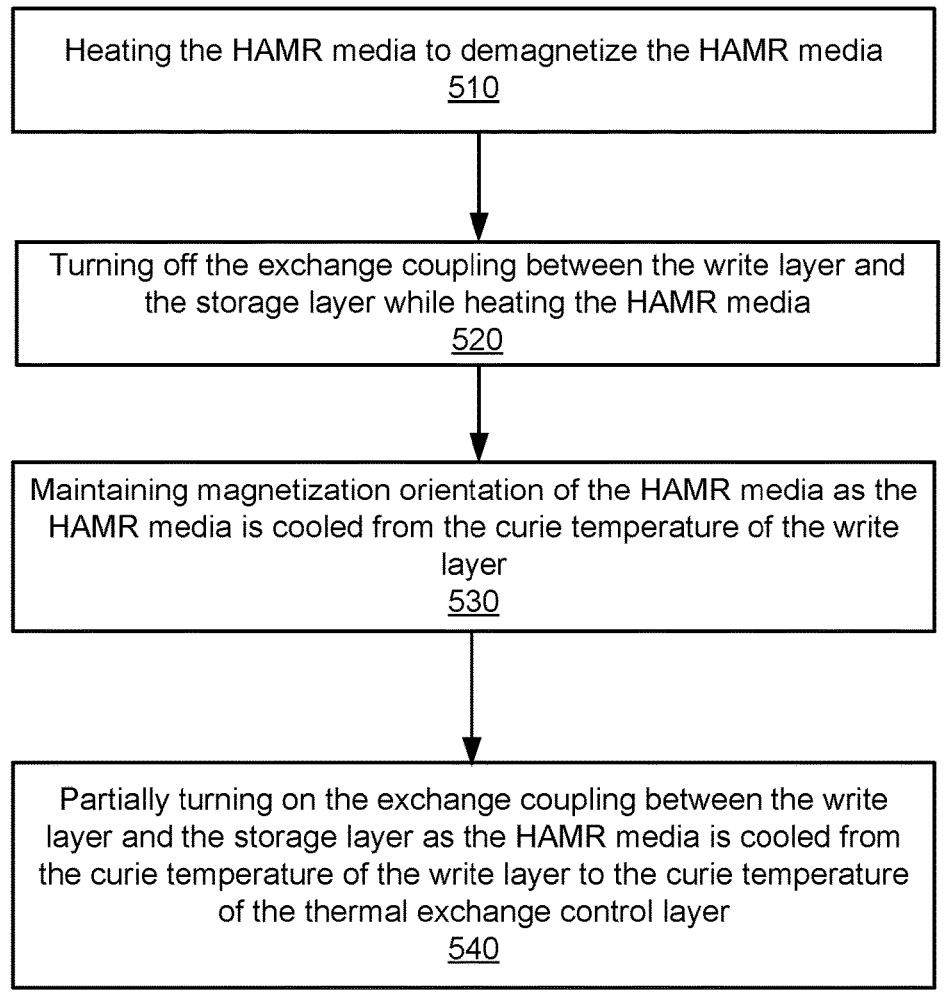
FIG. 5 shows a flow diagram for a HAMR media that undergoes a write process according to one aspect of the present embodiments.

FIG. 5 shows a flow diagram for a HAMR media that undergoes a write process according to one aspect of the present embodiments. At step 510, the layers of the HAMR media are at least partially or completely demagnetized by heating the HAMR media. For example, the storage layer, the thermal exchange control layer, and the write layer may be heated to the Curie temperature of the write layer which is higher than the Curie temperature of the storage layer and the thermal exchange control layer, in order to be substantially demagnetized. At step 520, the exchange coupling between the write layer and the storage layer is partially turned off responsive to heating the HAMR media to the Curie temperature of the write layer. At step 530, the HAMR media may be magnetized. Accordingly, the write layer, the thermal exchange control layer, and the storage layer are magnetized and oriented based on the applied magnetic field while the HAMR media is cooled from a temperature at or above the Curie temperature of the write layer.

At step 530, magnetization orientation within the HAMR media, e.g., write layer, thermal exchange control layer, and the storage layer, is maintained as the HAMR media is cooled from the Curie temperature of the write layer to the Curie temperature of the thermal exchange control layer. During the cooling period, at step 540, the exchange coupling between the write layer and the storage layer is at least partially turned on.

Accordingly, the thermal exchange control layer 130 by virtue of its lower Curie temperature in comparison to the write layer 120 and the storage layer 110, during the HAMR write process, decouples the noise present in the write layer 120 from the storage layer 110. Thus, during the HAMR write process, e.g., during heating and subsequently cooling period through high temperature with near field transducer (NFT), the vertical coupling between the write layer 120 and the storage layer 110 can be at least partially or completely turned on/off due to magnetization dependence of the thermal exchange control layer 130. As such, the amount of noise is reduced. In some embodiments, the write layer 120 stabilizes the storage layer 110 during the cooling period of the HAMR write process using the thermal exchange control layer 130 because the Curie temperature of the thermal exchange control layer 130 is lower than the Curie temperature of the storage layer 110 which has a lower Curie temperature than the write layer 120, thereby reducing freezing noise.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
 a storage layer;
 a thermal exchange control layer disposed over the storage layer; and
 a write layer disposed over the thermal exchange control layer, wherein a Curie temperature of the thermal exchange control layer is lower than a Curie temperature of the storage layer, and wherein the Curie temperature of the thermal exchange control layer is lower than a Curie temperature of the write layer, wherein the write layer has a higher saturation magnetization in comparison to the storage layer.

2. The apparatus of claim 1, wherein a material of the storage layer includes FePt.

3. The apparatus of claim 1, wherein a material of the write layer is selected from a group consisting of CoPt, FeCoPt, CoCrPt, FePd, CoPd, FeCoPd, CoCrPd, FeCo, and Co.

4. The apparatus of claim 1, wherein a material of the thermal exchange control layer includes FePtX, wherein X is selected from a group consisting of Cu, Ru, Rh, Nd, Mn, and Ag, wherein X reduces the Curie temperature of the thermal exchange control layer to below the Curie temperature of the storage layer and the write layer.

5. The apparatus of claim 1, wherein the thermal exchange control layer comprises magnetic material.

6. The apparatus of claim 1, wherein the Curie temperature of the storage layer is lower than the Curie temperature of the write layer.

7. The apparatus of claim 1, wherein the thermal exchange control layer comprises a plurality of thermal exchange control layers, wherein a Curie temperature of at least two thermal exchange control layers of the plurality of thermal exchange control layers differ from one another.

8. The apparatus of claim 1, wherein the thermal exchange control layer partially turns the vertical exchange coupling between the write layer and the storage layer on and off during write process and cooling, wherein the partial turn on and off by the thermal exchange control layer suppresses noise.

9. The apparatus of claim 1, wherein coercivity of the apparatus is reduced in presence of the thermal exchange control layer in comparison to an apparatus without the thermal exchange control layer.

10. The apparatus of claim 1, wherein a thickness of the storage layer ranges from 2 to 15 nm.

11. The apparatus of claim 1, wherein a thickness of the write layer ranges from 0.2 to 3 nm.

12. The apparatus of claim 1, wherein a thickness of the thermal exchange control layer ranges from 0.1 to 2 nm.

13. The apparatus of claim 1, wherein a writing temperature of the apparatus is reduced in presence of the thermal exchange control layer in comparison to an apparatus without the thermal exchange control layer.

14. A method comprising:
 at least partially demagnetizing a storage layer, a thermal exchange control layer, and a write layer of a heat assisted magnetic recording (HAMR) media responsive to application of heat to a Curie temperature of the storage layer, wherein the Curie temperature of the storage layer is lower than a Curie temperature of the write layer and wherein the Curie temperature of the write layer is greater than a Curie temperature of the thermal exchange control layer, and wherein the thermal exchange control layer is deposited between the write layer and the storage layer;
 turning exchange coupling between the write layer and the storage layer at least partially off responsive to application of heat to the Curie temperature of the write layer;
 magnetizing the storage layer, the thermal exchange control layer, and the write layer once the Curie temperature of the write layer is reached;
 maintaining magnetization within the storage layer, the thermal exchange control layer, and the write layer as the HAMR media is cooled from the Curie temperature of the write layer to the Curie temperature of the thermal exchange control layer; and
 turning exchange coupling between the write layer and the storage layer at least partially on responsive to the HAMR media cooling from the Curie temperature of the write layer to the Curie temperature of the thermal exchange control layer.

* * * * *